Jan. 5, 1932.  E. WILDHABER ET AL  1,839,517
EXPOSURE INDICATOR FOR PHOTOGRAPHIC SHUTTERS
Filed Oct. 28, 1925
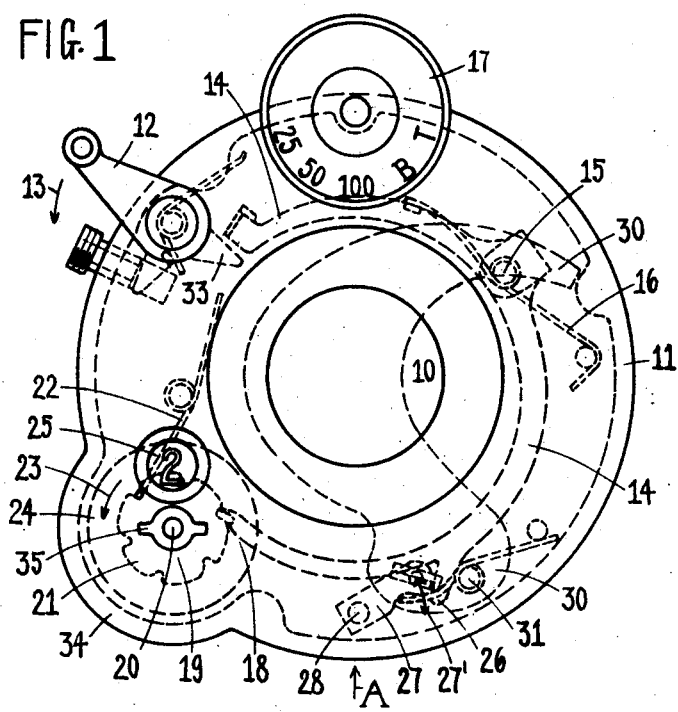
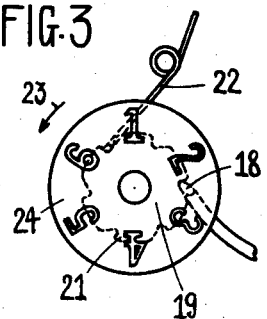
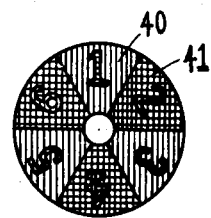
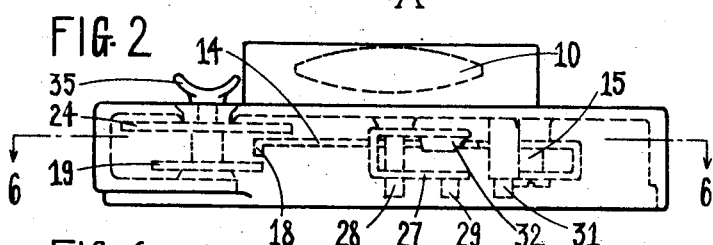
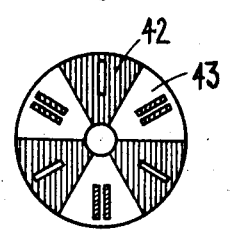
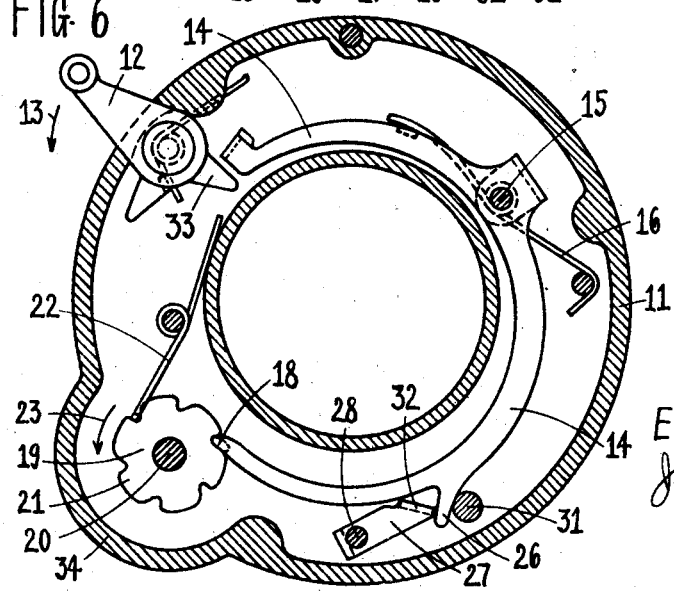
INVENTORS:
Ernest Wildhaber
Joseph Gstyr Patented Jan. 5, 1932

1,839,517

UNITED STATES PATENT OFFICE

ERNEST WILDHABER AND JOSEPH GSTYR, OF ROCHESTER, NEW YORK

EXPOSURE INDICATOR FOR PHOTOGRAPHIC SHUTTERS

Application filed October 28, 1925. Serial No. 65,388.

Our invention relates to the equipment of photographic film cameras, and particularly of photographic cameras adapted to use roll film.

One object of our invention is to provide means to check up the operation of the shutter, that is to provide a visible sign after an exposure has been effected. Hitherto operation of the shutter has been noticed merely by the click of the shutter. But no sign remained after the exposure, to indicate that an exposure had been actually effected. While usually this sound or click may be sufficient evidence, it cannot be depended upon in noisy surroundings, or when a self timer is used. Our invention will furnish positive decision in all cases.

A further object of our invention is to provide means for preventing double exposures and blanks. Danger of double exposure and of nonexposure exists especially, when a roll of film is not exposed completely in a single day, pictures being taken with it at intervals, when memory has faded out as to whether the film had been advanced after previous exposure.

In the drawings,

Fig. 1 is a front view of a photographic head or objective, showing an exposure indicator according to our invention, and its operative connection with a diagrammatic shutter.

Fig. 2 is a view from side "A" of Fig. 1.

Fig. 3 is an enlarged view of the principal parts of the exposure indicator shown in the Figures 1 and 2.

Fig. 4 is a front view of a slightly modified indicator disk or dial.

Fig. 5 is a front view of a further embodiment of an indicator disk, as may be used according to our invention.

Fig. 6 is a section along lines 6—6 of Fig. 2.

Referring to the Figures 1 and 2, a lens 10 and a shutter mechanism are located in a head 11. The shutter may be operated by pressing actuating lever 12 in the direction of arrow 13. This moves a lever 14, which is pivoted in the head 11 at 15 and is kept in the shown position by a spring 16 whose tension is adjustable from a disk 17 in a known and not indicated way. The known parts which provide time and bulb action of the shutter, are also omitted in the drawings.

A projection 18 of lever 14 periodically engages a toothed wheel or disk 19, which is pivoted on a center 20 and which contains ratchet teeth 21 on its periphery. A spring 22 prevents the disk 19 from turning oppositely to the direction of arrow 23. The short arbor 20 also carries an indicator disk or dial 24, which is rigidly connected with arbor 20 and disk 19. The dial 24 is provided with numbers, such as 1 to 6, corresponding to the usual number of exposures of a roll film, or also of a film pack. One of these numbers is made visible to the outside through an opening 25.

A further projection or arm 26 of lever 14 leans against a forked lever 27, which is pivoted at 28. Lever 27 carries a pin 29, see Fig. 2, which engages and operates two shutter leaves. One of these leaves is shown at 30. It is pivoted on a center 31. Lever 27 is capable of moving within an angle 27'. When actuating lever 12 and with it lever 14 are operated, projection 26 moves to the left, in which direction lever 27 resists motion. Projection 26 therefore climbs on top of the obliquely ending projection 32 of lever 27, the thin arm of lever 14 permitting elastic deflection. Near the end of the swing of lever 14, arm 26 snaps down from the other end of projection 32. When lever 14 is released from nose 33 of actuating lever 12, lever 14 and with it lever 27 under the influence of spring 16 immediately snap back. In the case of snapshot adjustment of disk 17, lever 14 goes back to starting position. Lever 27 is then released, and under the influence of a light spring (not shown) returns to the shown position.

In the moment, when the arm 26 of lever 14 climbs on projection 32, projection 18 starts to engage a tooth of disk 19, and during the swing of lever 14 moves disk 19 for one tooth or pitch. Projection 18 leaves engagement with disk 19 when lever 14 snaps down from projection 32, and during the quick return stroke does not touch disk 19. Immediately before projection 18 recedes from disk 19, spring 22 has passed the rounded top of a ratchet tooth, and after projection 18 has receded, it snaps completely into a tooth space of disk 19, thus preventing it from returning and keeping it in position. It is noted that in case no exposure is made, that is when lever 14 is not moved so far, that its arm 26 snaps down from projection 32, projection 18 does not leave engagement with disk 19, and when returning takes the disk 19 back with it. Disk 19 is therefore indexed only, when lever 14 and its arm 26 are moved so far as to snap down from projection 32, that is when an actual exposure is made. Inasmuch as the employed individual means are known, it is not deemed necessary to explain them with further detail.

It is noted that the indicator disk 24 is not operated directly by outside lever 12, but by a lever 14 on the inside of the shutter. An inside lever (14) is preferably chosen, which makes only one swing at every exposure, whereas outside lever 12 makes two swings, when the shutter is set to time action.

The dial indicated in Fig. 1 and Fig. 2 is separately shown in Fig. 3, together with the operating projection 18 and spring 22.

The numbers on the dial preferably correspond to the number of exposures of a film, so that the dial automatically returns to starting position before changing films. For convenience the dial 24 may however also be turned by hand to any number, in direction 23, by acting on a small knob 35 (Fig. 2), which is secured to arbor 20.

The operation of our exposure indicator in a roll film camera is as follows: After a new roll film is inserted, the exposure indicator should show number 1. If necessary it is turned to this position by hand. Indexing the dial without exposure can also be effected by covering the lens with a hand and then operating the shutter. This is practical especially when a dial according to Fig. 5 is used, as described hereafter.

The operation of the shutter can now be checked by a look to the exposure indicator. If no actual exposure was made when pressing level 12, the number of the indicator, and the number of the film cover appearing at the back of the camera will still be the same. If however exposure had been actually effected, the number appearing on the indicator will be different from the number of the film cover.

In the same way it can be checked, also after days or weeks, whether or whether not a film portion has been exposed. It has been exposed, when the indicator reads a number which is one unit larger than the number of the film, which is visible at the back of the camera. In this case the film should be advanced. The number of the indicator and the number of the film should be the same before an exposure. If this is checked in doubtful cases, no double exposures or blanks will ever be made.

Fig. 4 shows a dial, in which adjacent fields, 40, 41 are of different color, for instance red and black respectively. The numbers in the red fields are then preferably black, and the numbers in the black fields are preferably red. A rapid glance at the indicator is then sufficient for checking. The eye does not even need to take in the number. The shown embodiment is particularly desirable on small dials.

If so desired, the usually red film cover also may have corresponding numbers imprinted on similar fields, so that a red field on the indicator corresponds to a red field on the film cover, and black fields also correspond to one another.

Fig. 5 shows a dial, which contains only two different marks 42, 43 in fields of contrasting colors. One mark, 42, stands for the uneven numbers, 1, 3, 5, 7, 9 and the other mark, 43, stands for the even numbers 2, 4, 6, 8, 10. This dial evidently also affords full safety against double exposures and blanks, and is equally well applicable to film rolls of either 6, 10 or 12 exposures.

It is clearly understood, that the shown embodiments of our invention are illustrative examples only, that the invention is capable of further modifications without altering its spirit, and that our exposure indicator may be combined with any kind of shutter whatsoever. For definition of the scope of our invention it is relied upon the annexed claims.

We claim as our invention:

1. An exposure indicator for photographic shutter, containing a dial with fields of contrasting colors, said fields being arranged in a full circle, alternate fields having the same color.

2. An exposure indicator for photographic shutter, containing a rotatable member, said member carrying indicating signs, means for turning said member, said means forming part of the shutter operating mechanism and being held through spring pressure in operative connection with the actuating lever of the shutter, and means for interrupting said connection.

3. In a photographic shutter, an exposure indicator containing a rotatable member carrying a dial, an actuating lever of the shutter mechanism, an inside lever of the shutter mechanism, said inside lever being held in operative connection with said actuating lever through spring pressure, means for interrupting said operative connection, and means for indexing said rotatable member with said inside lever.

4. In a photographic shutter, an exposure indicator containing a rotatable member carrying a dial, an actuating lever for releasing the shutter, and means for indexing said rotatable member, said means forming part of the shutter operating mechanism and being operatively connected through spring pressure with said actuating lever.

5. In a photographic shutter, an exposure indicator containing a rotatable member carrying a dial, an actuating lever for releasing the shutter, means operatively connected with said actuating lever and forming part of the shutter operating mechanism, means for interrupting said operative connection, and means for indexing said member through said means of the shutter operating mechanism.

6. An exposure indicator for photographic shutters, for checking exposure by comparison of the indicator position and the position of the photographic film, containing an indicating member with distinguishing elements arranged in a plurality of pairs, for characterizing exposures of even and of uneven numbers respectively.

7. An exposure indicator for photographic shutters, for checking exposure by visual comparison of the indicator position and the position of the photographic film, containing an indicating member having distinguishing elements of two different aspects, one aspect corresponding to all exposures of even number only, the other aspect corresponding to all exposures of uneven number only, means for rendering visible one of said elements at a time, and an operative connection between said indicating member and the shutter operating mechanism.

In testimony whereof, we hereto affix our signatures.

ERNEST WILDHABER.
JOSEPH GSTYR.